United States Patent
Oyama

(10) Patent No.: US 11,144,267 B2
(45) Date of Patent: Oct. 12, 2021

(54) IMAGE FORMING APPARATUS, CONTROL METHOD FOR PRINTING SYSTEM, AND NON-TRANSITORY COMPUTER READABLE STORAGE MEDIUM

(71) Applicant: CANON KABUSHIKI KAISHA, Tokyo (JP)

(72) Inventor: Naoki Oyama, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/118,020

(22) Filed: Dec. 10, 2020

(65) Prior Publication Data

US 2021/0191678 A1  Jun. 24, 2021

(30) Foreign Application Priority Data

Dec. 18, 2019  (JP) .............................. JP2019-228183

(51) Int. Cl.
   *H04N 1/00* (2006.01)
   *G06F 15/00* (2006.01)
   *G06F 3/12* (2006.01)

(52) U.S. Cl.
   CPC .......... *G06F 3/1292* (2013.01); *G06F 3/1236* (2013.01); *G06F 3/1253* (2013.01); *G06F 3/1286* (2013.01)

(58) Field of Classification Search
   CPC .... G06F 3/1292; G06F 3/1236; G06F 3/1253; G06F 3/1286
   USPC ............................... 358/1.15, 1.14, 1.13, 1.1
   See application file for complete search history.

(56) References Cited

U.S. PATENT DOCUMENTS

| 2014/0092431 A1* | 4/2014 | Okuno | G06F 3/1292 358/1.15 |
| 2016/0006483 A1* | 1/2016 | Nishi | H04B 5/0031 455/41.1 |
| 2020/0104079 A1* | 4/2020 | Miyashita | G06F 3/1205 |

FOREIGN PATENT DOCUMENTS

JP     2005210267 A     8/2005

* cited by examiner

*Primary Examiner* — Douglas Q Tran
(74) *Attorney, Agent, or Firm* — Canon U.S.A., Inc. IP Division

(57) ABSTRACT

An image forming apparatus to be connected to a first information processing apparatus including a user interface, the image forming apparatus including: a first communication device configured to perform wireless communication; a second communication device configured to transmit, to the first information processing apparatus, connection information required for establishing the wireless communication using the first communication device. The image forming apparatus further comprises a controller configured to establish the wireless communication using the first communication device to/from a second information processing apparatus in accordance with a connection request based on the connection information, transmitted from the second information processing apparatus which has acquired the connection information via the user interface of the first information processing apparatus which has received the connection information; and a printing device configured to execute printing based on print data transmitted from the second information processing apparatus through the established wireless communication.

17 Claims, 7 Drawing Sheets

IMAGE FORMING APPARATUS, CONTROL METHOD FOR PRINTING SYSTEM, AND NON-TRANSITORY COMPUTER READABLE STORAGE MEDIUM

BACKGROUND

Field

The present disclosure relates to an image forming apparatus, a control method for a printing system, and a non-transitory computer readable storage medium, and more particularly, to an image forming apparatus to be wirelessly connected to another information processing apparatus, for example, a mobile device.

Description of the Related Art

In recent years, various terminal devices have been developed to perform data communication via a network, and the types and functions of terminal devices to be connected to the network have been increasing. Also, a connection method using not a wired network but a wireless network is becoming mainstream. Moreover, types of terminal devices have also been diversified, from a personal computer (hereinafter referred to as "PC") to a smartphone.

A wireless connection method to be used in smartphones and PCs is defined by wireless LAN-related standards referred to as "IEEE 802.11." In recent years, a wireless LAN mainly using a 2.4 GHz frequency band, which is supported by the standard referred to as "IEEE 802.11b/g/n," is used to connect to the Internet (IEEE 802.11n also supports a 5 GHz frequency band).

Further, in recent years, many people have used smartphones regardless of their age and gender, and the smartphone penetration rate is steadily increasing. Against such a background, there are also an increasing cases in which a smartphone is connected to an SFP or an MFP via a wireless LAN, for example, Wi-Fi (trademark), and a user prints data stored in the smartphone from the SFP or the MFP. The "SFP" refers to a single-function printer having a printing function. The "MFP" refers to a multi-function printer having, for example, a scanning function and a fax transmission function in addition to the printing function.

Further, even under an environment in which there is no access point, an SFP or MFP supporting Wi-Fi Direct using a wireless LAN enables the smartphone to directly connect to, for example, the MFP to execute printing.

However, while it is easy for users who are accustomed to Wi-Fi to connect from the smartphone to, for example, the SFP or the MFP by Wi-Fi, it is difficult for users who are not accustomed to Wi-Fi to connect from the smartphone to, for example, the SFP or the MFP by Wi-Fi, and such users may not be able to print data.

To solve such a problem, there is known a method in which a QR-code (trademark) into which information required for communication is written is displayed on a screen included in an MFP, for example, and formed of a liquid crystal display, for example, and a smartphone reads a QR code for connection.

Further, in Japanese Patent Application Laid-Open No. 2005-210267, there is disclosed a method in which connection information is converted into a two-dimensional bar code to be printed on a paper sheet, and the two-dimensional bar code is read by a smartphone, to thereby enable even an image input device that only includes a small-sized display to be connected to a printer.

However, in a case of an inexpensive SFP that does not include a display or only includes a simple display, the method of displaying a two-dimensional bar code, for example, a QR-code, cannot be adopted. Further, in the method of printing a QR-code, it is required to print the QR-code every time connection is performed, and hence paper sheets and toner are wastefully consumed. Moreover, there is also a fear that important information on a network other than the QR-code may be printed to cause a problem in terms of security.

SUMMARY

In view of the above, it is an object of the present disclosure to provide a method enabling even an inexpensive image forming apparatus that does not include a display or includes a simple display to be wirelessly connected from another information processing apparatus, for example, a smartphone, with a simple operation.

According to one embodiment, there is provided an image forming apparatus to be connected to a first information processing apparatus including a user interface, the image forming apparatus comprising: a first communication device configured to perform wireless communication; a second communication device configured to transmit, to the first information processing apparatus, connection information required for establishing the wireless communication using the first communication device; a controller configured to establish the wireless communication using the first communication device to/from a second information processing apparatus in accordance with a connection request based on the connection information, which is transmitted from the second information processing apparatus which has acquired the connection information via the user interface of the first information processing apparatus which has received the connection information; and a printing device configured to execute printing based on print data transmitted from the second information processing apparatus through the established wireless communication.

According to another embodiment, there is provided a control method for a printing system, the printing system including: an image forming apparatus including a first communication device configured to perform wireless communication, and a second communication device configured to transmit connection information required for establishing the wireless communication using the first communication device; a first information processing apparatus which is connected to the image forming apparatus and which includes a user interface configured to provide the connection information; and a second information processing apparatus which is wirelessly connectable to the image forming apparatus and which is configured to request the image forming apparatus to execute printing, the control method comprising: transmitting, by the second communication device of the image forming apparatus, the connection information to the first information processing apparatus; outputting, by the first information processing apparatus, based on the connection information received from the image forming apparatus, connection information to be provided to the second information processing apparatus, to the user interface; and establishing, by the second information processing apparatus, based on the connection information acquired via the user interface, the wireless communication using the first communication device to/from the image forming apparatus to transmit print data to the image forming apparatus through the wireless communication.

Further features will become apparent from the following description of exemplary embodiments with reference to the attached drawings.

DESCRIPTION OF THE EMBODIMENTS

Figure 1:
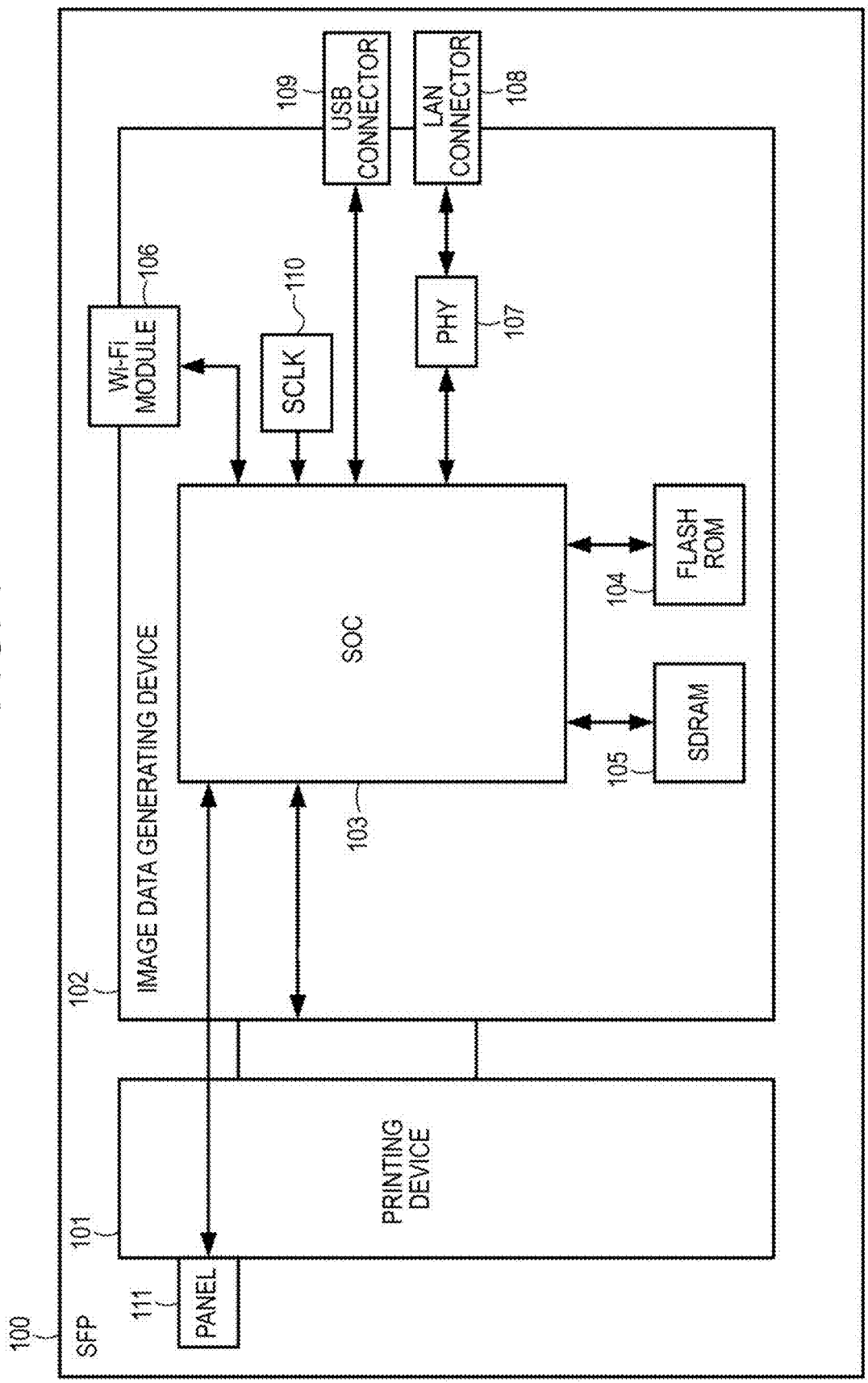
FIG. 1 is a block diagram for illustrating a hardware configuration of an SFP.

Now, referring to the drawings, an embodiment of the present disclosure is described. Note that, the embodiment described below is merely exemplary, and is not intended to limit the scope of the present disclosure to the exemplary embodiment. Further, not all of combinations of features described in the following embodiment are essential for solutions of the present disclosure.

FIG. 1 is a block diagram for illustrating a hardware configuration of a single-function printer (SFP) 100, which is an image forming apparatus to be used in this embodiment.

The SFP 100 includes a printing device 101 configured to perform printing and an image data generating device 102 configured to generate image data.

The image data generating device 102 has mounted thereon a system-on-chip (SOC) 103 having built therein a CPU (not shown in FIG. 1) configured to control the image data generating device 102.

A flash ROM 104 stores a program code to be used by the CPU built in the SOC 103 to execute control.

An SDRAM 105 is a volatile memory configured to store various types of information including the image data. Further, the program code stored in the flash ROM 104 may be temporarily loaded onto the SDRAM 105, and the program may be run on the SDRAM 105.

A Wi-Fi module 106 serving as a first communication device is controlled by the CPU serving as a controller, which is built in the SOC 103, and is configured to control a wireless network.

A PHY 107 is a physical layer to be used to transmit and receive data on a network. Through connection of a LAN cable to a LAN connector 108, the SFP 100 is enabled to be connected to a wired network. Through issuing of a printing instruction from a personal computer (PC) connected to the network via the PHY 107 and the LAN connector 108, printing via the Wi-Fi module 106 is enabled.

A USB connector 109 is a connector to which the PC or another device is to be connected in a one-to-one manner. This enables the SFP 100 to perform printing based on a printing instruction from a signal line other than a printing instruction transmitted via the network.

A system clock (SCLK) 110 is configured to generate a clock signal for operating the SOC 103. Then, the SOC 103 generates a frequency required in a phase lock loop (PLL) (not shown) included therein to generate a clock signal required for Wi-Fi modules such as the SDRAM 105 and the PHY 107. Further, the clock signal is similarly supplied to the CPU built in the SOC 103.

A panel 111 is provided in order to notify a user settings of the printer and display of an error. Note that, in this embodiment, an inexpensive panel is used as the panel 111 in order to reduce cost of the SFP 100 as well. As described later, the panel 111 in this embodiment does not include, for example, a dot-matrix display capable of high-definition display, but is formed of minimum required components such as a switch, an LED, or a liquid crystal display having a size corresponding to about one to two lines.

Figure 2:
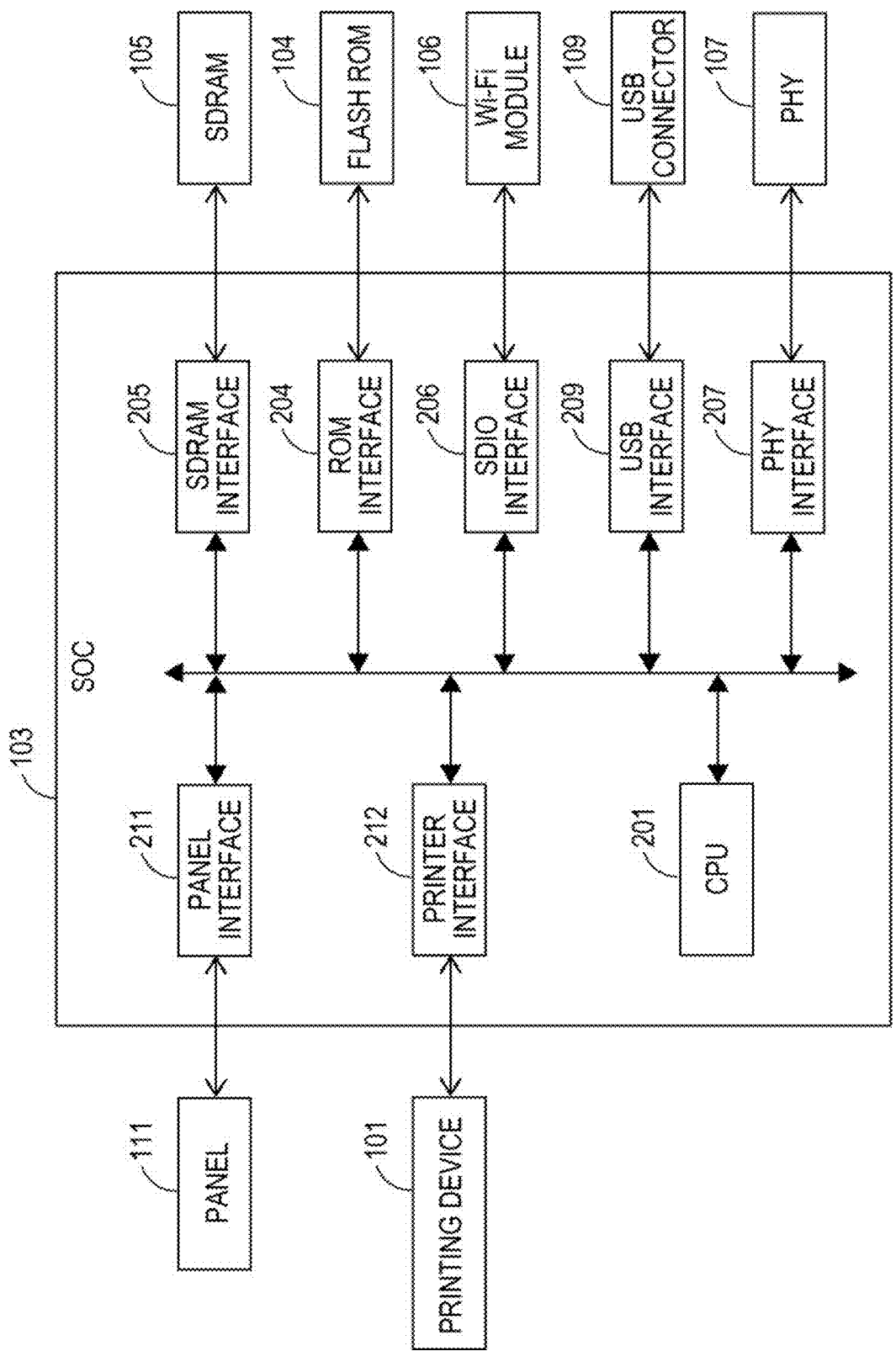
FIG. 2 is a block diagram for illustrating an internal configuration of an SOC.

FIG. 2 is a block diagram for illustrating an internal configuration of the SOC 103 illustrated in FIG. 1.

A CPU 201 is configured to control the image data generating device 102 illustrated in FIG. 1.

A ROM interface 204 is configured to control the flash ROM 104 illustrated in FIG. 1.

An SDRAM interface 205 is configured to control the SDRAM 105 illustrated in FIG. 1.

An SDIO interface 206 is configured to control the Wi-Fi module 106 illustrated in FIG. 1.

A PHY interface 207 is configured to control the PHY 107 illustrated in FIG. 1 via a general-purpose interface, for example, a media independent interface (MII).

A USB interface 209 serving as a second communication device is an interface for communicating to/from a device connected to the USB connector 109 illustrated in FIG. 1.

A panel interface 211 is an interface for communicating to/from the panel 111 illustrated in FIG. 1.

A printer interface 212 is an interface for transmitting and receiving a command and a status for controlling the printing device 101 illustrated in FIG. 1 and transmitting image data.

Figure 3:
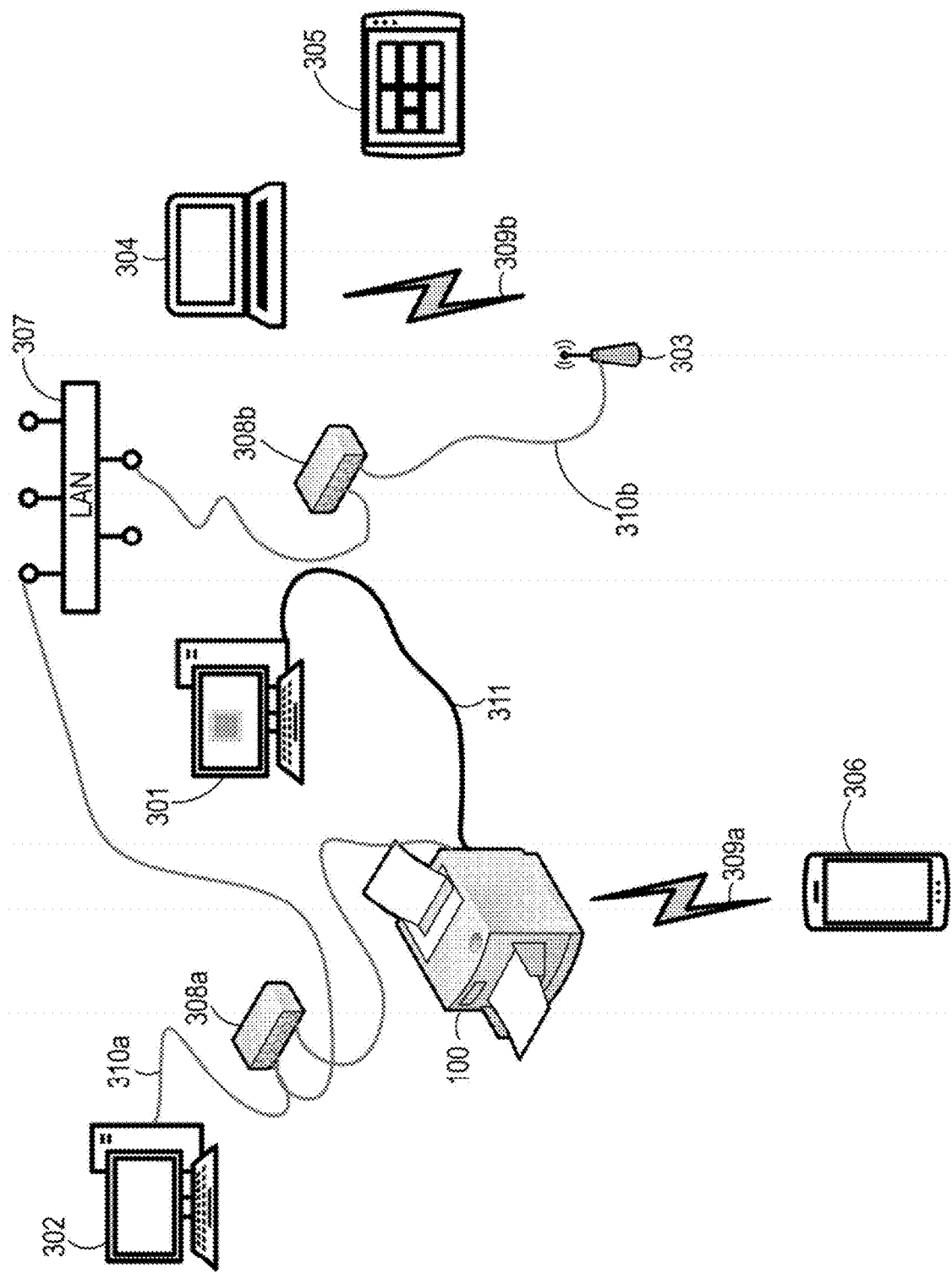
FIG. 3 is an illustration of an example of connection inside a printing system.

Next, referring to FIG. 3, an example of devices included in a printing system in this embodiment and an example of connection of the SFP 100 are described.

The SFP 100 is a single-function printer serving as the image forming apparatus, which is illustrated in FIG. 1.

A PC 301 is a personal computer serving as an information processing apparatus. The PC 301 is connected to the SFP 100 by a USB cable 311. As described later, the PC 301 includes a screen formed of, for example, a liquid crystal display, as a user interface for providing a QR-code to a smartphone 306.

A PC 302 is, as with the PC 301, also a personal computer serving as the information processing apparatus. The PC 302 is connected to the SFP 100 by a LAN cable 310a via a HUB 308a. That is, the PHY interface 207, the PHY 107, and the LAN connector 108 also function as the second communication device. Further, the PC 302 is connected to an in-house LAN 307 by the LAN cable 310a via the HUB 308a.

An access point 303 for a wireless LAN is connected to the in-house LAN 307 by a LAN cable 310b via a HUB 308b.

A notebook PC 304 is wirelessly connected through a radio wave 309b, and is connected to the in-house LAN 307 via the access point 303. The notebook PC 304 is connected to the access point 303 through the radio wave 309b having a frequency within the 2.4 GHz band or the 5 GHz band standardized by IEEE 802.3 described above.

A tablet computer 305 is, as with the notebook PC 304, also connected to the in-house LAN 307 via the access point 303.

The smartphone 306 is an information processing apparatus which is one type of a mobile device. The smartphone 306 can be wirelessly connected to the SFP 100 by the Wi-Fi Direct through a radio wave 309a, and can instruct the SFP 100 to execute printing of print data stored in the smartphone 306.

Figure 6:
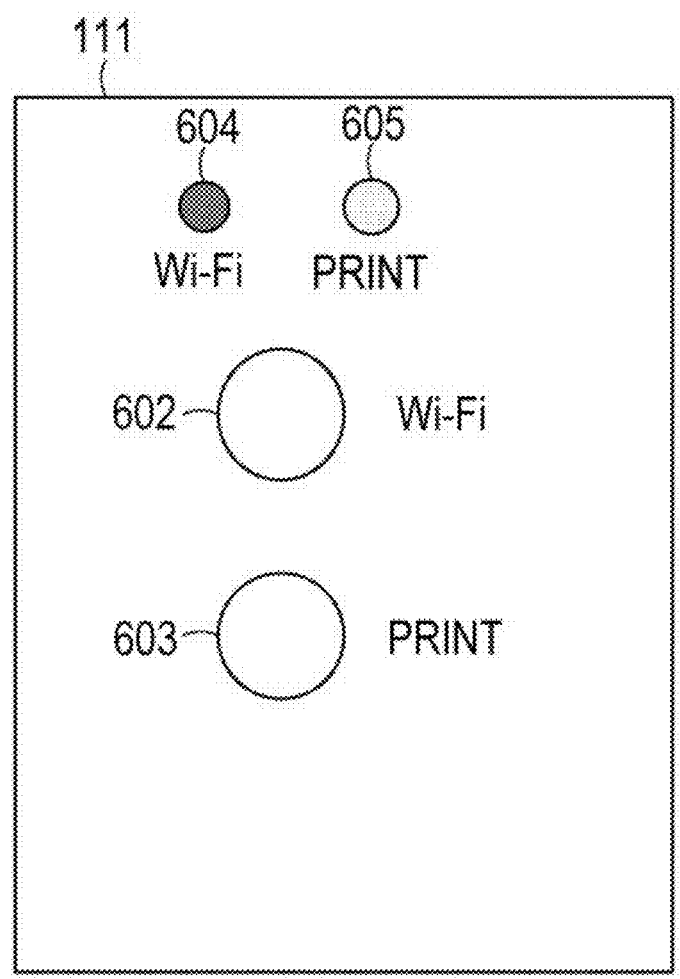
FIG. 6 is a diagram for illustrating a panel of the SFP.

Next, referring to FIG. 6, the panel 111 included in the SFP 100 is described.

The panel 111 of the SFP 100 in this embodiment has a feature in that the panel 111 does not include a dot-matrix display capable of high-definition display, for example, a liquid crystal display, and is an inexpensive display.

A button 602 is a button for performing Wi-Fi Direct connection.

A button 603 is a button for printing a status or the like of the SFP 100 in a status print, for example.

An LED 604 is configured to notify of whether the SFP 100 is connected by Wi-Fi, and turns on when the SFP 100 is connected by Wi-Fi. Meanwhile, the LED 604 flashes on and off during a process of negotiation.

An LED 605 repeatedly flashes on and off when the SFP 100 is executing printing.

In the following, there is described a case of performing wireless communication connection by the Wi-Fi Direct. The smartphone 306 is the mobile device connected to the SFP 100 without the intermediation of the access point 303.

When the Wi-Fi Direct connection is performed between the smartphone 306 and the SFP 100, the user presses the button 602 for Wi-Fi Direct. Then, on the screen of the PC 301 connected to the SFP 100 via the USB cable 311, a status monitor including a QR-code for the Wi-Fi Direct is displayed.

Figure 4:
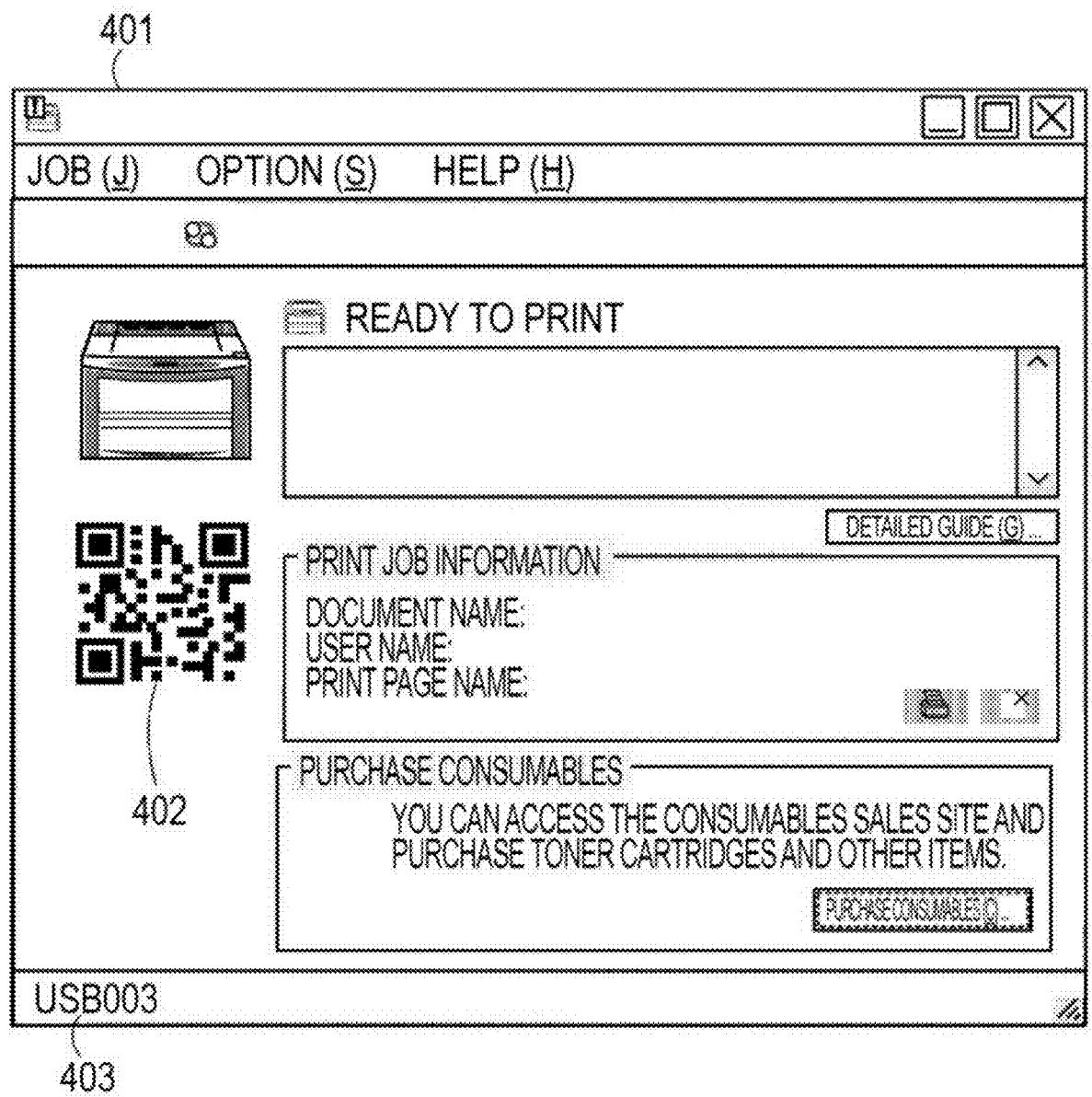
FIG. 4 is an illustration of an example of a status monitor displayed on a PC.

Next, referring to FIG. 4, an example of a status monitor 401 including a QR-code 402, which is displayed on the screen of the PC 301, is described.

The PC 301 is in a state of connected in advance to the SFP 100 by the USB cable via the USB connector 109.

The status monitor 401 is displayed on the screen of the PC 301. The status monitor 401 may be built in a printer driver, but in this embodiment, it is assumed that the status monitor 401 is started by another application independently of the installation of the printer driver.

In the example of FIG. 4, in a lower left part 403 of the status monitor 401, it is shown that the PC 301 is connected to a port of "USB003" and the SFP 100 is ready to print.

Connection information required for performing the Wi-Fi Direct connection is transmitted to the PC 301 from the SFP 100 via the USB cable 311. The connection information required for performing the Wi-Fi Direct connection, which is transmitted from the SFP 100, includes identification information for identifying the Wi-Fi module 106, for example, a service set identifier (SSID). (The connection information transmitted from the SFP 100 is hereinafter also referred to as "primary connection information.") The PC 301 generates, based on the primary connection information transmitted from the SFP 100, the QR-code 402 being a two-dimensional bar code into which the connection information required for performing the Wi-Fi Direct connection is written. (The connection information generated by the PC 301 is hereinafter also referred to as "secondary connection information.")

It should be understood that the QR-code 402 may also be directly displayed on the panel 111 of the SFP 100. However, the SFP 100 to be used in this embodiment is an inexpensive apparatus, and thus the flash ROM 104 has a small capacity, and further, the panel 111 does not include a high-definition dot-matrix display. Accordingly, the SFP 100 does not generate the QR-code 402. Further, the SFP 100 transmits only the primary connection information to the PC 301.

The SSID is the primary connection information, which is transmitted from the SFP 100, is converted by the PC 301 into the QR-code 402, being the secondary connection information. The QR-code 402 is displayed on the screen of the PC 301 as a part of the status monitor 401. With this configuration, it is possible to achieve the connection by the Wi-Fi Direct without increasing the cost of the entire printing system. As another example, the primary connection information can also be transmitted to the PC 302 via the LAN cable.

Next, referring to FIG. 5A, FIG. 5B, FIG. 5C, and FIG. 5D, an operation procedure for reading the QR-code 402 displayed on the screen of the PC 301 into the smartphone 306 is described with reference to screens displayed on the smartphone 306.

Figure 5A:
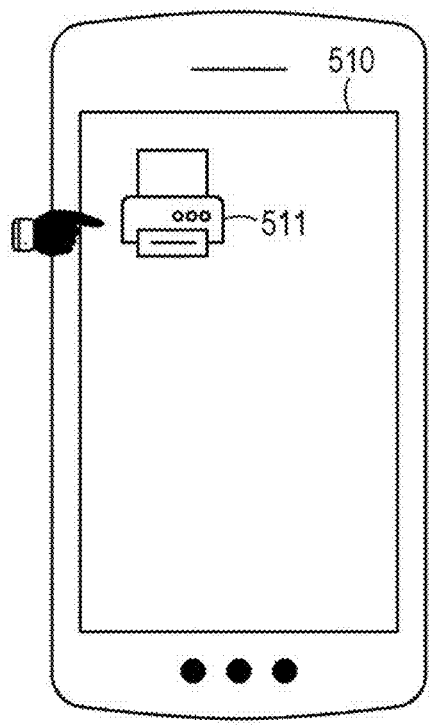
FIG. 5A, FIG. 5B, FIG. 5C, and FIG. 5D are each an illustration of an example of a screen displayed on a smartphone.

FIG. 5A is an illustration of an initial screen 510 to be displayed on the smartphone 306. In this example, an application (hereinafter referred to as "Wi-Fi printing app") for causing the SFP 100 to execute printing by the Wi-Fi Direct through smartphone 306 is already installed onto the smartphone 306. Accordingly, an icon 511 indicating the Wi-Fi printing app is displayed on the initial screen 510. When the user touches the icon 511 to launch the Wi-Fi printing app, the initial screen 510 of FIG. 5A transitions to screen 520 of FIG. 5B.

On screen 520, buttons 521 to 523 for selecting various measures for connecting by the Wi-Fi Direct, such as manual search, automatic search, and a QR-code, are displayed. In the following, there is described a case in which a method of performing connection by Wi-Fi through use of the QR-code is selected.

Figure 5B:
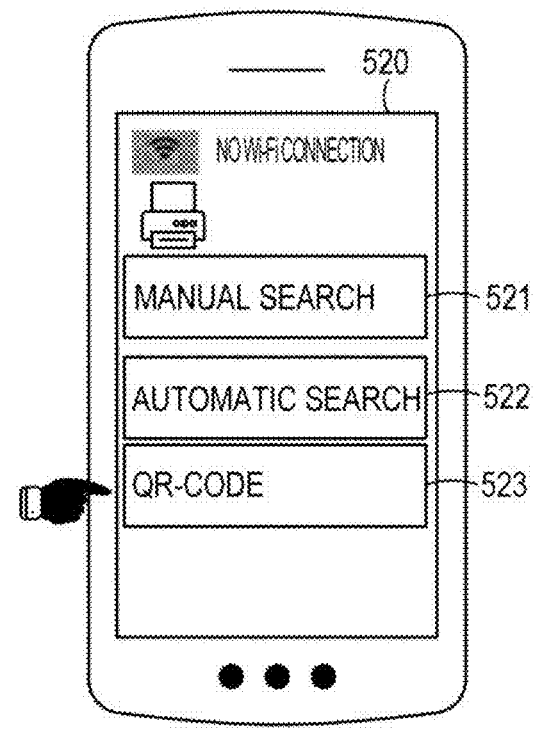
Figure 5C:
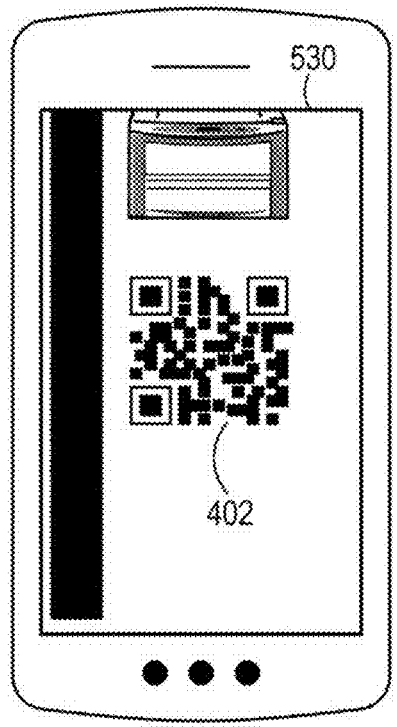

When the user touches the button 523 for the QR-code on the screen 520 of FIG. 5B, as illustrated in FIG. 5C, the screen 520 transitions to a screen 530 for reading the QR-code 402 through use of a camera function of the smartphone 306. When the user uses the camera function of the smartphone 306 to read the QR-code 402 displayed on the PC 301, the QR-code 402 is photographed. Then, the application of the smartphone 306 extracts and acquires, from the QR-code 402 image data, the connection information formed of the identification information. The smartphone 306 uses the acquired connection information to perform Wi-Fi Direct connection to the SFP 100.

Figure 5D:
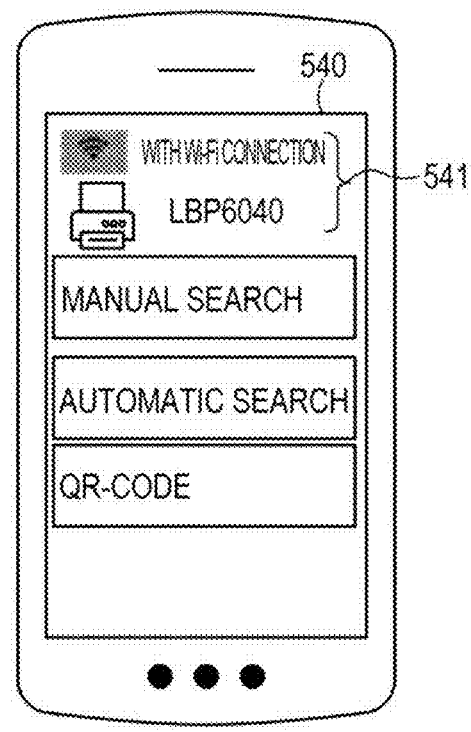

When negotiation for wireless LAN interfaces between the SFP 100 and the smartphone 306 is finished, and the connection therebetween is started, the screen 530 returns to a screen 540 illustrated in FIG. 5D, for example. On screen 540, in addition to the buttons 521 to 523 displayed on the screen 520 of FIG. 5B, the name of the connected SFP 100 is displayed along with the display of "With Wi-Fi Connection" (which is indicated by reference numeral 541).

Through the operation procedure described above, a state in which printing can be executed from the smartphone 306 to the SFP 100 by the Wi-Fi Direct connection is achieved.

Figure 7:
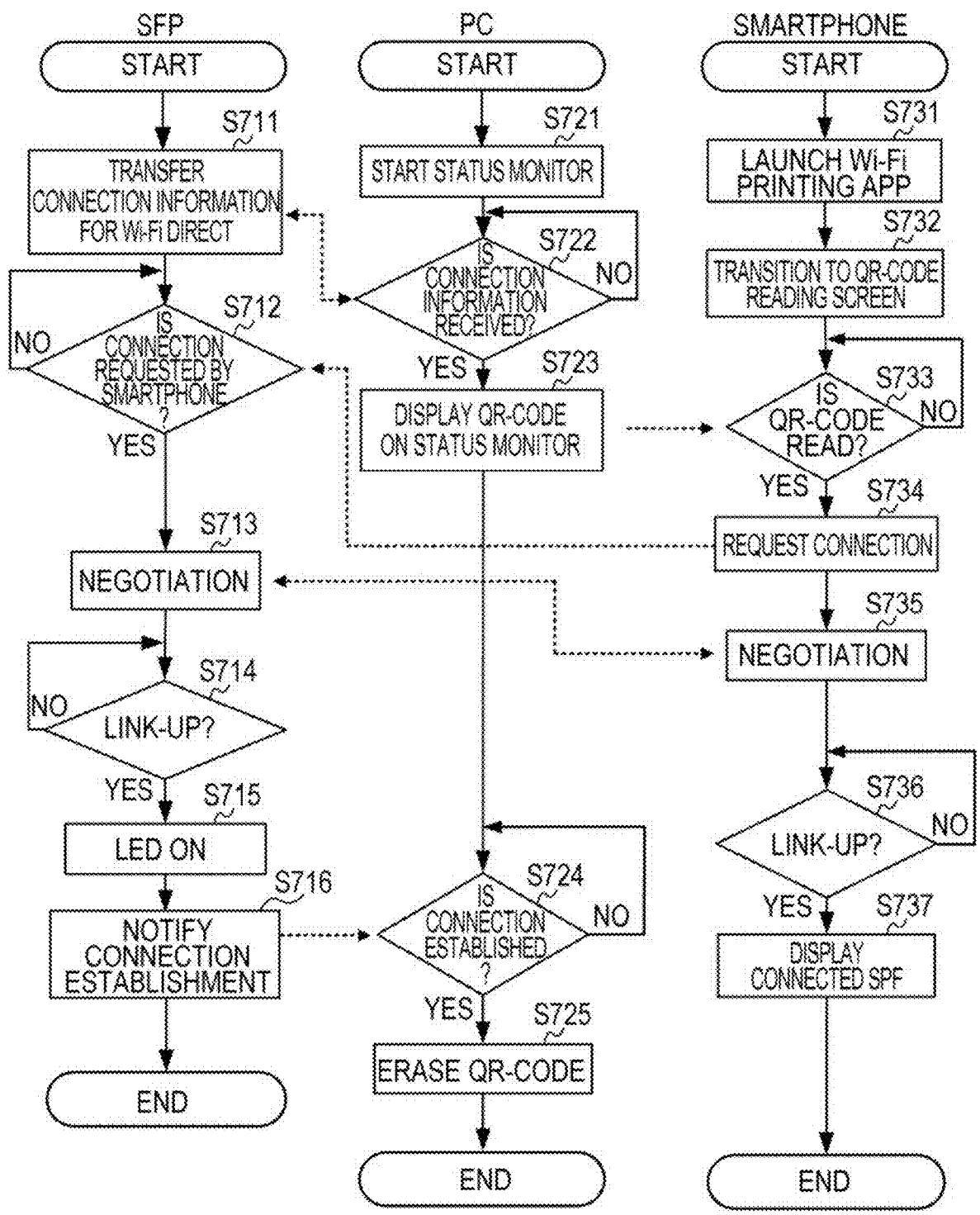
FIG. 7 shows flowcharts for illustrating processing to be executed when Wi-Fi Direct connection is performed.

Next, referring to flowcharts of FIG. 7, there are described processing procedures to be executed by the respective devices: the SFP 100, the PC 301, and the smartphone 306 when the connection by the Wi-Fi Direct is performed in this embodiment. In FIG. 7, in order to facilitate understanding of relevance between the processing procedures to be executed by the respective devices, the processing procedures to be executed by the SFP 100, the PC 301, and the smartphone 306 are illustrated side by side. In the left flowchart, the processing procedure to be executed by the SFP 100 is illustrated. In the middle flowchart, the processing procedure to be executed by the PC 301 is illustrated. In the right flowchart, the processing procedure to be executed by the smartphone 306 is illustrated.

In the following, there is described an example in which a user who owns the smartphone 306 causes, by the Wi-Fi Direct, the SFP 100 to print the print data stored in the smartphone 306, such as a document or an image.

The user starts in advance the status monitor 401 on the PC 301 (Step S721). Then, the PC 301 transitions to a state in which the PC 301 waits for the reception, from the SFP 100, of connection information required for connection by the Wi-Fi Direct (Step S722). In FIG. 4, the example in which the status monitor 401 is displayed on the screen of the PC 301 is illustrated.

Further, on the smartphone 306, when the user touches the icon 511 displayed on the screen 510 (see FIG. 5A), the smartphone 306 launches the Wi-Fi printing app (Step S731). Then, when the screen 510 transitions to the screen 520 (see FIG. 5B) and the user selects the button 523 for the QR-code on the screen 520, the smartphone 306 displays the screen 530 (see FIG. 5C) for reading the QR-code (Step S732).

Further, on the SFP 100, when the user presses the button 602 (see FIG. 6) for Wi-Fi Direct provided on the panel 111, the SFP 100 transfers to the PC 301 an SSID being the primary connection information required for the Wi-Fi Direct connection (Step S711). As a result of this, the SFP 100 transitions to a standby state for accepting the Wi-Fi Direct. At this time, on the panel 111, the LED 604 for Wi-Fi connection starts to flash on and off. Then, the SFP 100 waits for a connection request to be made from the smartphone 306 (Step S712).

When the PC 301 receives the primary connection information transmitted from the SFP 100 in Step S711 ("YES" in Step S722), the PC 301 generates from the primary connection information the QR-code 402 as the secondary connection information, and outputs the QR-code 402 onto the status monitor 401 (Step S723). In FIG. 4, the example in which the QR-code 402 is displayed on the status monitor 401 is illustrated.

When the smartphone 306 displays the screen 530 for reading the QR-code in Step S732, the user who owns the smartphone 306 waits for the QR-code 402 to be displayed on the screen of the PC 301. Then, when the QR-code 402 is displayed on the screen of the PC 301, the user puts the QR-code 402 into a photographing range of the camera of the smartphone 306. When the QR-code 402 is photographed ("YES" in Step S733), the smartphone 306 reads the QR-code 402, extracts the SSID being the primary connection information from the read QR-code 402, and requests connection of the SFP 100 (Step S734).

Then, when the SFP 100 receives the connection request from the smartphone 306 which has extracted the primary connection information, the SFP 100 uses the connection information to perform negotiation for connection with the smartphone 306 (Step S713 and Step S735).

When the negotiation is finished and the SFP 100 links up with the smartphone 306 ("YES" in Step S714), the SFP 100 changes the state of the LED 604 for Wi-Fi connection, which is flashing on and off, into a turned-on state, to thereby notify the user that the Wi-Fi Direct connection is established (Step S715). Further, the SFP 100 notifies the PC 301 that the Wi-Fi Direct connection is established (Step S716).

When the PC 301 receives the notification that the Wi-Fi Direct connection is established ("YES" in Step S724), the PC 301 erases the QR-code 402 displayed on the status monitor 401 (Step S725).

Further, when the negotiation is finished and the smartphone 306 links up with the SFP 100 ("YES" in Step S736), the smartphone 306 displays on the screen 540 (see FIG. 5D) the fact that the connection by the Wi-Fi Direct is established and the name of the connected SFP 100 (Step S737).

As described above, according to this embodiment, the user is enabled to easily connect the smartphone 306 to the SFP 100 by the Wi-Fi Direct to print from the SFP 100 a document or image stored in the smartphone 306, for example.

In this embodiment, the primary connection information transmitted from the SFP 100 to the PC 301 is converted into the QR-code being the secondary connection information by the application controlling the status monitor of the PC 301. However, in the present disclosure, image data representing the QR-code may be transmitted from the SFP 100, and the image data may be displayed as it is on the screen of the PC 301.

Further, in this embodiment, the QR-code is displayed on the screen of the PC 301 as the secondary connection information based on the primary connection information transmitted from the SFP 100 and formed of the SSID, for example, and the smartphone 306 reads the displayed QR-code. However, in the present disclosure, the secondary connection information is not limited to the two-dimensional bar code, for example, the QR-code, and a one-dimensional bar code may be displayed. Further, another method using a text string or the like may be used as long as the method enables connection information to be transmitted from the PC 301 to the smartphone 306.

According to this embodiment, it is possible to wirelessly connect the information processing apparatus with a simple operation to print a document or image stored in the information processing apparatus.

OTHER EMBODIMENTS

Embodiments also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, the present disclosure may be applied to a system formed of a plurality of devices, or may be applied to an apparatus formed by one device.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-228183, filed Dec. 18, 2019, which is hereby incorporated by reference herein in its entirety.

What is claimed is:

1. An image forming apparatus to be connected to a first information processing apparatus including a user interface, the image forming apparatus comprising:
  a first communication device configured to perform wireless communication;
  a second communication device configured to transmit, to the first information processing apparatus, connection information required for establishing the wireless communication using the first communication device;
  a controller configured to establish the wireless communication using the first communication device to/from a second information processing apparatus in accordance with a connection request based on the connection information, transmitted from the second information processing apparatus that has acquired the connection information via the user interface of the first information processing apparatus which has received the connection information; and
  a printing device configured to execute printing based on print data transmitted from the second information processing apparatus through the established wireless communication.

2. The image forming apparatus according to claim 1, wherein the wireless communication is Wi-Fi Direct.

3. The image forming apparatus according to claim 1, wherein the connection information to be transmitted to the first information processing apparatus includes identification information for identifying the first communication device.

4. The image forming apparatus according to claim 1, wherein the user interface is a display device, and a two-dimensional bar code as the connection information is displayed on the display device.

5. A control method for a printing system,
  the printing system including:
    an image forming apparatus including a first communication device configured to perform wireless communication, and a second communication device configured to transmit connection information required for establishing the wireless communication using the first communication device;
    a first information processing apparatus which is connected to the image forming apparatus and which includes a user interface configured to provide the connection information; and
    a second information processing apparatus which is wirelessly connectable to the image forming apparatus and which is configured to request the image forming apparatus to execute printing,
  the control method comprising:
    transmitting, by the second communication device of the image forming apparatus, the connection information to the first information processing apparatus;
    outputting, by the first information processing apparatus, based on the connection information received from the image forming apparatus, connection information to be provided to the second information processing apparatus, to the user interface; and
    establishing, by the second information processing apparatus, based on the connection information acquired via the user interface, the wireless communication using the first communication device to/from the image forming apparatus to transmit print data to the image forming apparatus through the wireless communication.

6. The control method according to claim 5, wherein the second information processing apparatus is a mobile device.

7. The control method according to claim 5, wherein the wireless communication is Wi-Fi Direct.

8. The control method according to claim 5, wherein the user interface is a display device, and
  Wherein the control method further comprises displaying a two-dimensional bar code as the connection information on the display device.

9. The control method according to claim 5, wherein the image forming apparatus and the first information processing apparatus are connected to each other by a cable.

10. The control method according to claim 5, further comprising generating, by the first information processing apparatus, secondary connection information based on the received connection information.

11. The control method according to claim 10, further comprising providing, by the first information processing apparatus, the secondary connection information via the user interface.

12. The control method according to claim 10,
  wherein the connection information to be transmitted by the image forming apparatus includes identification information for identifying the first communication device, and
  wherein the secondary connection information generated by the first information processing apparatus includes an image.

13. The control method according to claim 10, wherein the secondary connection information is a two-dimensional bar code.

14. The control method according to claim 10, further comprising acquiring, by the second information processing apparatus, the connection information by photographing the secondary connection information.

15. The control method according to claim 5, further comprising providing, by the first information processing apparatus, a status of the image forming apparatus through the user interface.

16. A control method for an information processing apparatus configured to cause an image forming apparatus wirelessly connected to the information processing apparatus to execute printing,
  the image forming apparatus including a first communication device configured to perform wireless communication, and a second communication device configured to transmit, to another information processing apparatus, connection information required for establishing the wireless communication using the first communication device,
  the control method comprising:
    acquiring the connection information via a user interface included in the another information processing apparatus;

causing the image forming apparatus to establish the wireless communication using the acquired connection information; and requesting the image forming apparatus to execute printing through the wireless communication.

17. A non-transitory computer readable storage medium having stored a program for causing a computer to execute a control method for a printing system, the printing system comprising:
- an image forming apparatus including a first communication device configured to perform wireless communication, and a second communication device configured to transmit connection information required for establishing the wireless communication using the first communication device;
- a first information processing apparatus which is connected to the image forming apparatus and which includes a user interface configured to provide the connection information; and
- a second information processing apparatus which is wirelessly connectable to the image forming apparatus and which is configured to request the image forming apparatus to execute printing, the control method comprising:
- transmitting, by the second communication device of the image forming apparatus, the connection information to the first information processing apparatus;
- outputting, by the first information processing apparatus, based on the connection information received from the image forming apparatus, connection information to be provided to the second information processing apparatus, to the user interface; and
- establishing, by the second information processing apparatus, based on the connection information acquired via the user interface, the wireless communication using the first communication device to/from the image forming apparatus to transmit print data to the image forming apparatus through the wireless communication.

* * * * *